UNITED STATES PATENT OFFICE.

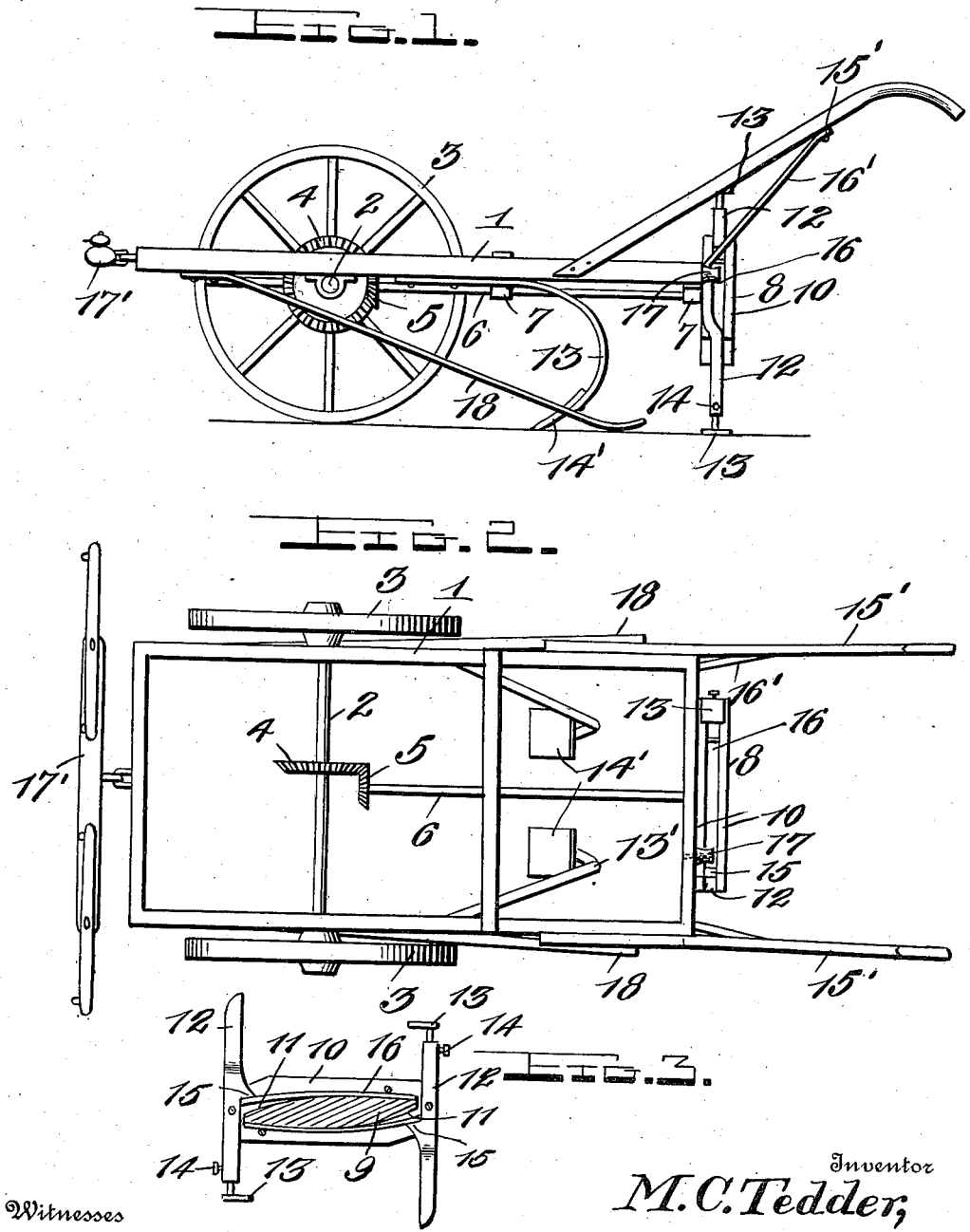

MORGAN C. TEDDER, OF SIMMS, TEXAS.

COTTON-CHOPPER.

1,013,969.  Specification of Letters Patent.  Patented Jan. 9, 1912.

Application filed June 19, 1911.  Serial No. 633,972.

*To all whom it may concern:*

Be it known that I, MORGAN C. TEDDER, a citizen of the United States, residing at Simms, in the county of Bowie and State of Texas, have invented certain new and useful Improvements in Cotton-Choppers, of which the following is a specification, reference being had to the accompanying drawings.

My invention relates to new and useful improvements in cotton choppers and more particularly to an attachment for a hand guided chopper, and my object is to provide means for gaging the distance between the frame of the cultivator and the ground so that the chopping device will engage the soil when the device is driven over all kinds of ground.

A further object resides in providing a chopping wheel having pivoted arms, and a still further object resides in providing resilient means for action upon said arms, whereby the hoes at the ends of said arms are driven with considerable force into the ground.

With these and other objects in view, my invention consists in the novel features of construction, combination and arrangement of parts as will be hereinafter referred to and more particularly pointed out in the specification and claims.

In the accompanying drawing forming a part of this application, Figure 1 is a side elevation of the device. Fig. 2 is a top plan view of the device, and, Fig. 3 is a side elevation of the chopping wheel with one of the side walls thereof removed.

In carrying out my invention, I shall refer to the drawing in which similar reference characters designate corresponding parts throughout the several views and in which 1 indicates a frame of rectangular or any other desired shape, oscillatingly mounted on an axle 2, said axle having mounted at the ends thereof, the driving wheels 3. Permanently keyed on the axle 2 is an enlarged bevel gear 4 which meshes with a similar but smaller gear 5 carried on one end of a shaft 6, which is mounted on said frame 1 and extends at substantially right angles to the axle 2. This shaft 6 is rotatably mounted in bearings 7 on cross bars of the frame and has mounted on the outer end, or end opposite that carrying the gear 5, a rotary chopping wheel comprising an elongated hub or the like 8, which hub consists of a core 9 and the side walls 10. Said side walls extend above and below the upper and lower faces of said core, and said upper and lower faces are, at opposite ends thereof, slightly inclined, as disclosed at 11, and pivotally mounted between the side walls 10 at the ends thereof, is a pair of arms 12, said arms being pivoted intermediate of their ends. One end of each of said arms 12 is provided with a socket which is adapted to receive the shank of a hoe 13, the set screw 14 being provided to retain said hoe in any adjusted position, and the ends of said arms carrying these hoes are disposed in opposite directions, as disclosed in Fig. 3, so that as said hub rotates, the engagement of the hoes with the ground will be identical in each case.

Each of the arms 12 is provided adjacent its pivotal point with a shoulder 15 which, when the arms are properly positioned on the hub, are disposed adjacent the inclined portions 11 of the upper and lower faces of said core, and secured between the side walls 10 of said hub and resting on said upper and lower faces of the core, are the leaf springs 16, the free ends of which are engaged with the shoulders 15 of said arms. The tendency of these springs 16 is to retain the arms 12 in a substantially vertical position, as disclosed in Fig. 3, so that the same engage the ends of the core 9 and those portions of said arms which are disposed between the pivotal points and the ends opposite those carrying the hoes, are of greater length than the portions between the pivotal points and the hoe-carrying ends, the purpose of which will be hereinafter and more particularly described. Also carried on the rear end of the frame 1 and in the path of the free ends of the arms 12, is a roller or the like 17 which, as the hub is rotated, is adapted to contact with said free ends of the arms and swing the same on their pivots against the action of the springs 16. The inclined portions 11 on the upper and lower faces of said core 9 will allow the free ends of the springs to be forced thereagainst by the moving of the arms on their pivotal points and as soon as the free ends of said arms leave the roller 17, the springs 16 will again force said arms into the position shown in Fig. 3, but the hoes 13 will engage the ground before said arms reach their vertical positions, whereby it will be seen that considerable force will be added to the action of the hoes upon the ground. The frame 1 has also mounted thereon a pair of arms 13', which arms extend inwardly toward the longitudinal center of the frame and curve downwardly, having mounted on the free ends thereof, the scrapers 14'. Also mounted on said frame adjacent the end carrying the rotary chopping wheel, are the handle members 15' supported by means of the brace bars 16', whereby it will be seen that the device is adapted for manual operation, but I have also mounted on the forward end thereof, a double-tree 17', whereby the machine may be driven by animals, if desired.

One of the greatest difficulties in the use of such cotton choppers as I have already described, has been the fact that the rotary chopper will not engage the ground to cultivate the same when the device is driven over very rough ground such as corn ridges and the like, but I have provided means to obviate these difficulties, and to this end, I provide the pair of leaf springs 18, one mounted on each of the side bars of the frame 1. These leaf springs have one of their ends secured to the frame and are inclined downwardly and rearwardly so as to have a portion immediately adjacent the opposite end in contact with the ground, and it will be seen that when the device is being manually operated, the operator can always gage the distance between the rear end of the frame 1 and the ground, in view of the fact that the springs are always in engagement therewith, forming feelers or the like, In this manner, when the wheels ride over large ridges, which would naturally carry the frame upwardly therewith and ordinarily raise the springs from the ground, pressure may be placed upon the handle so that the springs will be retained in contact with the ground while the wheels are riding over the ridges, and in this manner, the rotary chopping wheel will always engage the soil. These springs will, of course, yield to the pressure placed upon the handle members by the operator, so that a deeper cut by the chopping wheel may be obtained, if desired, but it will be seen that after considerable use, the operator will become so familiar with the pressure necessary to be placed on the springs, that it will be no difficulty or trouble whatsoever to operate the device in connection with said springs.

Although I have described the chopping wheel of my device as being provided with leaf springs to coöperate with the pivoted arms, it will be readily understood that other forms of springs may be provided such as coil springs, with slight changes in the construction of the hub for the reception thereof, and it will also be appreciated that these changes as well as other changes in form, proportion and in the minor details of construction may be resorted to without sacrificing or departing from the spirit of the invention, whatsoever.

From the foregoing it will be seen that I have provided a simple and economical form of cotton chopper, whereby the distance of the rear end of the frame carrying the chopping wheel and the ground may be gaged by the operator so that the chopping blades of said wheel may always be engaged with the ground no matter how rough the same may be.

It will still further be seen that I have provided a simple but effective means for forcing the chopping blades into engagement with the ground by means of the springs provided.

It will still further be seen that my device is of such simple construction as to be readily and cheaply manufactured, and furthermore, the improvements are such as to be readily adapted to be applied to many cotton choppers now in use.

What I claim is:—

1. In a cotton chopper of the class described, the combination with a frame oscillatingly mounted on an axle, and driving wheels carried on said axle; of a shaft extending longitudinally of the frame, means to rotate said shaft through the rotation of the axle, a chopping device carried on said shaft, comprising a body member, arms pivoted thereto, spring means carried by said body member adapted to retain said arms in a predetermined position, and means carried by the frame adapted to contact with said arms to swing the same on their pivots against the action of said springs as said chopping device is rotated.

2. In a cotton chopper of the class described, the combination with a frame oscillatingly mounted on an axle, and driving wheels carried by said axle; of a shaft extending longitudinally of the frame, means to rotate said shaft with the rotation of the axle, a chopping device carried on the free end of said shaft, comprising a body member, arms pivoted intermediate of their ends to said body member, said arms being provided with shoulders adjacent their pivotal points, spring members carried by said body member having contact with said shoulders to normally retain said arms in a predetermined position, and means carried on said frame in the path of said arms adapted to swing said arms against the action of said springs as the chopping device is rotated.

3. In a cotton chopper of the class described, the combination with a frame oscillatingly mounted on an axle, and driving wheels carried on said axle; of a shaft extending longitudinally of the frame, means to rotate said shaft with the rotation of the axle, a body member carried on the free end of said shaft to form a substantial head at that end thereof, a pair of arms pivoted intermediate of their ends to opposite sides of the body member, said arms being provided with shoulders adjacent their pivotal points, hoes carried on opposite ends of said arms, spring members carried by said body member and engaging the shoulders of said arms to retain the same in a predetermined position, and a roller carried on the rear end of said frame in the path of said arms to swing the same against the action of said springs as said chopping device is rotated.

In testimony whereof I hereunto affix my signature in the presence of two witnesses.

MORGAN C. TEDDER.

Witnesses:
P. G. NEAL,
J. B. GRISHAM.

Copies of this patent may be obtained for five cents each, by addressing the "Commissioner of Patents Washington, D. C."